United States Patent [19]

Bohme et al.

[11] 4,210,692
[45] Jul. 1, 1980

[54] OVERLAY SHEET AND WOOD LAMINATE

[75] Inventors: Reinhard D. Bohme, Bloomington; Robert O. Ragan, Minneapolis, both of Minn.

[73] Assignee: Champion International Corporation, Stamford, Conn.

[21] Appl. No.: 961,755

[22] Filed: Nov. 17, 1978

[51] Int. Cl.$^2$ .................. D21H 5/18; D21H 5/20; B32B 21/02; B32B 21/10; B32B 21/06
[52] U.S. Cl. .................... 428/106; 162/145; 162/146; 162/147; 162/164 R; 428/113; 428/211; 428/233; 428/248; 428/251; 428/265; 428/268; 428/285; 428/286; 428/297; 428/375; 428/393; 428/394; 428/498; 428/573; 428/535; 428/537; 428/438; 428/445
[58] Field of Search ............... 428/106, 113, 211, 233, 428/248, 249, 251, 265, 268, 285, 286, 288, 297, 375, 393, 394, 396, 456, 498, 523, 535, 537; 162/145–147, 164 R, 164 EP

[56] References Cited

U.S. PATENT DOCUMENTS

| | | | |
|---|---|---|---|
| 1,904,718 | 4/1933 | Cochrane | 428/106 |
| 1,954,754 | 4/1934 | Hartzell | 428/106 X |
| 2,802,765 | 8/1957 | Baymiller et al. | 428/456 X |
| 2,816,851 | 12/1957 | Arledter | 428/211 |
| 3,208,901 | 9/1965 | Kelley et al. | 428/211 X |
| 3,220,918 | 11/1965 | Shisko | 162/145 |
| 3,485,663 | 12/1969 | Debenedetti | 428/393 |
| 3,616,128 | 10/1971 | Pacourek et al. | 428/113 X |
| 3,917,448 | 11/1975 | Wood | 428/113 X |
| 4,129,675 | 12/1978 | Scott | 428/297 X |
| 4,131,704 | 12/1978 | Erickson et al. | 428/297 X |
| 4,132,591 | 1/1979 | Merges | 162/146 |
| 4,132,821 | 1/1979 | Hiers et al. | 428/288 X |
| 4,142,017 | 2/1979 | Blackburn et al. | 428/286 X |
| 4,152,317 | 5/1979 | Agouri et al. | 162/146 X |
| 4,154,697 | 5/1979 | Rave | 162/146 X |

*Primary Examiner*—Harold Ansher
*Attorney, Agent, or Firm*—Evelyn M. Sommer

[57] ABSTRACT

The present invention relates to a novel sheet adapted to be adhered to and form the outer layer of a wood article, said sheet being made from a furnish comprising, for each 100 parts by weight, from about 10 to 25 parts synthetic pulp, 10 to 25 parts by weight mineral fiber, 0.1 to 2 parts size, 0.1 to 2 parts wet strength agent, and 79.8 to 46 parts wood fiber and to laminates comprising a wood core and said sheet adhered to at least one surface of said core.

8 Claims, 2 Drawing Figures

OVERLAY SHEET AND WOOD LAMINATE

BACKGROUND OF THE INVENTION

Currently, many wood articles, such as plywood are manufactured by having a central core covered by an outside wood ply which is able to bridge and hide the defects in the core below. The use of an exterior wood ply, while generally suitable has some defects in addition to the cost. First is the need to ensure that the exterior ply has no surface defects itself which detracts from its appearance. This is particularly true in decorative plywoods used as exterior surfaces in rooms or to make articles. Secondly, even if all the conditions are met as to exterior appearance, the outer plywood ply must be treated in order to make it maintain its structural integrity under wet conditions when it is used as the outer ply for exterior plywood in order to be able to withstand weathering. Moreover, wood ply very often for appearance purposes, needs to be texturized and it is expensive to do so with a wood ply.

Efforts to overcome these shortcomings have included the use of resin saturated papers which are applied as the outside wood ply in an exterior plywood. These, however, are not entirely satisfactory since they are not only extremely costly, but they do not satisfactorily cover or bridge the defects in the core beneath. Moreover, they do not, in some cases give good abrasion resistant surfaces which is important for exterior grade plywood and at the same time, they tend to expand excessively when either submerged in water or under severe wet conditions and thus, lose their structural integrity. In some cases they tend to delaminate from the ply beneath.

SUMMARY OF THE INVENTION

The instant invention overcomes the problems of the prior art and provides for paper overlay sheets and resultant wood laminates, such as plywood, which have low density for structural stability and nail receptivity, are moldable at elevated temperatures for texturizing, have low expansivity when submerged in water for structural integrity under wet conditions, have excellent bridging properties over defects in the underlying plies, and provide a good abrasion resistance surface.

Briefly, the present invention comprises a sheet adapted to be adhered to and form the outer layer of a wood article, said sheets being made from a furnish comprising, for each 100 parts by weight, 10 to 25 parts synthetic pulp, 10 to 25 parts by weight mineral fiber, 0.1 to 2 parts size, 0.1 to 2 parts wet strength agent, and 79.8 to 46 parts wood fiber. The invention also comprises a laminate comprising a wood core and the sheet described above adhered to at least one surface of said core.

DETAILED DESCRIPTION OF THE DRAWINGS

DETAILED DESCRIPTION

Figure 1:
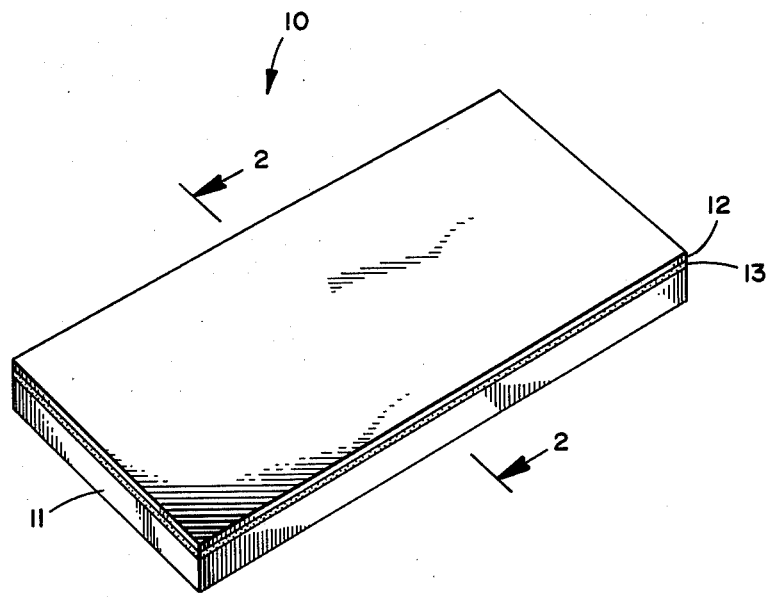
FIG. 1 is a perspective view of a wood laminate of the present invention.

The present invention will be described in connection with exterior grade plywood, it being understood that it is equally applicable to interior grade plywood and other laminated wood articles. Moreover, as used herein, the term "plywood" is meant to include plywoods having a central core of one or more plies and exterior plies. It will be evident that the invention is applicable to wood articles generally where it is desired to have an exterior surface with the characteristics provided by the sheet of present invention.

With respect to the sheet, it is formed of the following essential components: synthetic pulp, mineral fiber, size, wet strength agent, and wood fiber pulp.

Any of the conventional and known synthetic pulps are suitable although it is preferred to use synthetic pulp fibers made of polyethylene in a fibrous form. Synthetic pulp may also be prepared from synthetic polymeric materials such as polypropylene, polystyrene, and mineral extended polymers, e.g., kaolin filled polyethylene. Such pulps and their method of manufacture are set forth in the book entitled "Synthetic Polymers and the Paper Industry", by V. M. Wolpert, Miller Freeman Publications, Inc., 1977.

With respect to the mineral fiber, while asbestos and mineral wool fibers can be used, it is preferred to use glass fibers. Most suitable are glass fibers having a nominal length of about 0.5 centimeters.

As to the size, it can be any ordinarily used in making paper as long as the composite sheet is hard sized and thus, chemically different sizes are suitable. More specifically, sizes made from naturally occurring materials such as rosin size, fortified rosin size can be used, those made from the synthetic materials such as decenyl succinic anyhdride, HERCON 40 (Hercules brand synthetic size), and ACCOSTRENGTH 516 (American Cyanamid brand synthetic size), as well as combinations of these materials. It is presently believed that wax sizes, silicone sizes, AQUAPEL, and the like sizes may not be entirely suitable in that they may interfere in subsequent operations such as adhering the sheet to the wood core and subsequent painting of the sheet.

The wet strength resins can be any of the resins conventionally used in paper making to impart wet strength, although it is preferred to use KYMENE wet strength resins such as disclosed in U.S. Pat. Nos. 2,926,116 and 2,926,154. While resins of the urea-formaldehyde and melamine formaldehyde types will work, they are not preferred due to the evolution of formaldehyde during drying of the sheet.

The wood fiber utilized can be any wood fiber available, including virgin wood fibers such as groundwood or kraft, although with the instant invention it is preferred to use primarily recycled newsprint fiber because sheets made using these fibers have the lowest moisture expansivity of all wood fiber types available. Also, other fibers give denser sheets and a low density is desired from economic and performance standpoints. To avoid high densities in such cases one should use an amount of wood fiber at the low end of the range set forth below and mineral fiber at the higher end of the range. The densities for the preferred handsheet compositions fall into the range of 2.3 to 2.7 lbs./point (weight of 1000 square feet divided by caliper). Densities of the sheet compositions made by machine may vary from those made by hand.

As to proportions, there must be, for 100 parts by weight of the furnish used to make the sheet, 10 to 25 parts synthetic pulp, 10 to 25 parts by weight mineral fiber, 0.1 to 2 parts size, 0.1 to 2 parts wet strength agent, and 79.8 to 46 parts wood fiber. Preferred proportions are 12 to 18 parts synthetic pulp, 12 to 18 parts mineral fiber, 0.75 to 1.5 parts size, 0.75 to 1.5 parts wet strength agent, and 60 to 70 parts wood fiber.

In making the sheet, a pulp furnish is first made up using the desired proportions of the essential ingredients discussed above, and the sheet formed on conventional paper making equipment. It can be made, of course, to any caliper desired and on any basis weight depending upon the proportions of components utilized. The caliper of the sheet of the instant invention will depend upon the thickness desired of the final product. After the sheet is formed, it is pressed and dried again on conventional equipment and under conventional conditions used to make conventional paper sheets.

In making plywood, the thus-formed sheet is laminated onto the plywood core utilizing the standard apparatus and any known plywood adhesive.

The invention will be further described in connection with the following example which is set forth for purposes of illustration only and which proportions are in parts by weight unless expressly stated to the contrary.

EXAMPLE

A. The following pulp furnish was mede up and formed into a sheet of basis weight 115 lbs/MSF in a handsheet mold:

|  | Parts by Weight |
| --- | --- |
| Chopped glass fiber of nominal length 0.5 cm | 15 |
| Synthetic pulp manufactured by Crown Zellerbach, the base of the SWP being polyethylene | 15 |
| Rosin size | 1 |
| 0.15% Decenyl succinic anhydride sold as ACCOSIZE 18 and 0.15% ACCOSTRENGTH 516 used as supplied by American Cyanamid, both synthetic sizing agents | 0.3 |
| On-as-supplied basis of KYMENE 368, a retention and wet strength additive of the polyamide type sold by Hercules Inc. | 1 |
| Wood fiber pulp composed of 90% recycled news and 10% recycled Kraft containers | 67.7 |

The sheet was pressed and dried in the conventional manner and the following sheet properties resulted.

| Base Weight | 115 lbs./MF |
| --- | --- |
| Caliper | 48 mil |
| Density | 2.40 lbs. per point |
| Expansion, 24 hrs. in water | 0.18% |
| Taber Stiffness, dry | 725 g |
| 24 hr. water soak | 210 g |
| Taber Stiffness, after treatment | |
| at 350° F. for 1 minute - Dry | 1025 g |
| Taber Stiffness, 24 hr. water soak | 350 g |
| Ply bond strength; in peel mode 24 hr. soak | 230 g/in |
| Ply bond strength; in peel mode fused 24 hour soak | 520 g/in. |

The sheet was then laminated to plywood core having 1½ inch diameter defects (circular holes) in the surface ply. These samples were soaked in room temperature water for one to two weeks and intermittently examined for telegraphing (the presence of a defect underlying the laminate which was visible on the surface). Such telegraphing was expressed by the formation of deep depressions or dimples in the surface sheet, a decidedly undesirable occurrence and an indication of failure. The laminates were also inspected for bonding strength and % expansion using the standard tests for this purpose. The results are set forth in TABLE I below.

Figure 2:
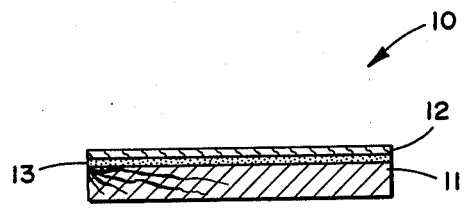
FIG. 2 is a section taken along lines 2—2 of FIG. 1.

FIGS. 1 and 2 illustrate a laminate 10 made in accordance with the instant example, having a wood core 11 having adhered thereto overlay sheet 12 by means of adhesive 13.

B. A series of other laminates were made utilizing five sheets made from formulations outside of the scope of the present invention using the same sheet forming materials and laminating procedures set forth in paragraph A above. These were tested in like manner and the results are set forth in TABLE I below.

TABLE I

|  | Ex. A | Ex. B1 | Ex. B2 | Ex. B3 | Ex. B4 | Ex. B5 |
| --- | --- | --- | --- | --- | --- | --- |
| Sheet Formulation: | | | | | | |
| Wood pulp, % | 68 | 70 | 69 | 99 | 69 | 70 |
| Glass fiber, % | 15 | 0 | 0 | 0 | 30 | 30 |
| Synthetic pulp, % | 15 | 30 | 30 | 0 | 0 | 0 |
| Size | 1 | 0 | 1 | 1 | 1 | 0 |
| Test Results: | | | | | | |
| % Expansion | .18 | 1.1 | 1.2 | 1.0 | 0.4 | .28 |
| Plybond psi | 54 | 99 | — | 47 | 12.1 | — |
| Soak performance | no dimpling | severe dimpling | severe dimpling | severe dimpling | slight dimpling | very slight dimpling |

It will be noted that only the sheet of the present invention had the limited expansion, bonding strength when wet, and defect covering capability making it satisfactory for use.

C. Examples A and B were prepared using an 85/15 mix of news/recycled kraft material. Table II illustrates other combinations of news/recycled kraft material while holding the other constituents constant.

TABLE II

| Ratio recycled pulp, news/kraft | 0/1 | 1/1 | 0/1 | 1/1 | 0/1 | 1/1 | 0/1 | 1/1 |
| --- | --- | --- | --- | --- | --- | --- | --- | --- |
| Wood pulp % | 68 | 68 | 68 | 68 | 68 | 68 | 68 | 68 |
| Glass fiber % | 15 | 15 | 30 | 30 | 0 | 0 | 0 | 0 |
| Syn. pulp % | 15 | 15 | 0 | 0 | 30 | 30 | 0 | 0 |
| Size % | 1 | 1 | 1 | 1 | 1 | 1 | 1 | 1 |
| Wet strength | 1 | 1 | 1 | 1 | 1 | 1 | 1 | 1 |
| % expansion | .3 | .2 | .2 | .18 | 1.2 | 1.0 | 1.4 | .9 |
| Internal bond after pressing, | 58.1 | 48.5 | 12.5 | 12.5 | 68 | 132 | 57 | 29 |

TABLE II-continued

| Ratio recycled pulp, news/kraft | 0/1 | 1/1 | 0/1 | 1/1 | 0/1 | 1/1 | 0/1 | 1/1 |
|---|---|---|---|---|---|---|---|---|
| psi Dimpling | slight | slight | slight | slight | severe | severe | very severe | very severe |

Again the sheet combining all ingredients—wood fiber, glass fiber, synthetic pulp and sizing and wet strength agents is satisfactory. Table II shows that the choice of which type of wood fiber is used is less critical.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A sheet adapted to be adhered to and form the outer layer of a wood article, said sheet being formed from a furnish comprising, for each 100 parts by weight, 10 to 25 parts of a synthetic pulp comprising a synthetic polymer in fibrous form, 10 to 25 parts mineral fiber, 0.1 to 2 parts size, 0.1 to 2 parts wet strength resin, and 79.8 to 46 parts wood fiber pulp.

2. The sheet of claim 1 wherein the synthetic pulp comprises polyethylene or polypropylene, the mineral fiber is glass fiber, and the wood fiber is selected from recycled newsprint fiber, recycled kraft container fiber, or mixtures thereof.

3. The sheet of claim 2 wherein the proportions, for each 100 parts by weight, are 12 to 18 parts polyethylene base synthetic pulp, 12 to 18 parts glass fiber, 0.75 to 1.5 parts size, 0.75 to 1.5 parts wet strength resin, and 60 to 70 parts wood fiber consisting essentially of recycled newsprint and at least 10 parts kraft fiber.

4. An overlay sheet adapted to be adhered to and form the outer layer of plywood, said sheet being formed from a furnish consisting essentially of, for each 100 parts by weight, 15 parts of a polyethylene fibrous base synthetic pulp; 15 parts chopped glass fiber having a nominal length of about 0.5 cm.; 1.3 parts size comprising rosin size; 1 part wet strength resin; and 67.7 parts wood fiber pulp consisting essentially of recycled newsprint fiber and at least 10 parts kraft fiber.

5. A laminate comprising a wood core and an overlay sheet adhered to at least one surface of said core, said overlay sheet formed from a furnish comprising, for each 100 parts by weight, 10 to 25 parts of a synthetic pulp comprising a synthetic polymer in fibrous form, 10 to 20 parts mineral fiber, 0.1 to 2 parts size, 0.1 to 2 parts wet strength resin, and 79.8 to 51 parts wood fiber.

6. The laminate of claim 5 wherein the wood core is a plywood core.

7. The laminate of claim 5 wherein the synthetic pulp comprises polyethylene fibers, the mineral fiber is glass fiber, and the wood fiber is selected from recycled newsprint, recycled kraft container, or mixtures thereof.

8. The laminate of claim 5 wherein the proportions, for each 100 parts by weight, are 12 to 18 parts polyethylene base synthetic pulp, 12 to 18 parts glass fiber, 0.75 to 1.5 parts size, 0.75 to 1.5 parts wet strength resin, and 60 to 70 parts wood fiber consisting essentially of recycled newsprint and at least 10 parts kraft fiber.

* * * * *